US007348367B2

(12) United States Patent
Thetford et al.

(10) Patent No.: US 7,348,367 B2
(45) Date of Patent: Mar. 25, 2008

(54) DISPERSANTS

(75) Inventors: Dean Thetford, Manchester (GB); Patrick John Sunderland, Manchester (GB); Tom Annable, Manchester (GB)

(73) Assignee: The Lubrizol Corporation, Wickliffe, OH (US)

( * ) Notice: Subject to any disclaimer, the term of this patent is extended or adjusted under 35 U.S.C. 154(b) by 316 days.

(21) Appl. No.: 10/257,132

(22) PCT Filed: Apr. 4, 2001

(86) PCT No.: PCT/GB01/01524

§ 371 (c)(1),
(2), (4) Date: Feb. 6, 2003

(87) PCT Pub. No.: WO01/80987

PCT Pub. Date: Nov. 1, 2001

(65) Prior Publication Data

US 2003/0181544 A1 Sep. 25, 2003

(30) Foreign Application Priority Data

Apr. 20, 2000 (GB) ................................ 0009798.0

(51) Int. Cl.
*C09D 11/00* (2006.01)

(52) U.S. Cl. ........................ 523/160; 523/161; 524/504; 525/328.2; 525/384; 525/386; 528/332

(58) Field of Classification Search ................ 523/160, 523/161

See application file for complete search history.

(56) References Cited

U.S. PATENT DOCUMENTS

| 3,704,255 A | 11/1972 | Braun et al. |
| 5,011,629 A | 4/1991 | Bilbo |
| 5,980,772 A | 11/1999 | Fujii et al. |

FOREIGN PATENT DOCUMENTS

| EP | 158406 A1 * | 10/1985 |
| EP | 0 164 817 A2 | 12/1985 |
| EP | 208041 A2 * | 1/1987 |
| EP | 0 752 439 A1 | 1/1997 |
| WO | 98/19784 | 5/1998 |
| WO | 99/49963 | 10/1999 |
| WO | 99/55763 | 11/1999 |
| WO | 01/21298 A1 | 3/2001 |

* cited by examiner

*Primary Examiner*—Bernard Lipman
(74) *Attorney, Agent, or Firm*—Samuel B. Laferty

(57) ABSTRACT

Basic and acid dispersants derived from branched alkyl aliphatic acids and alcohols and one or more hydroxy carboxylic acid or lactone to give a polyoxyalkylenecarbonyl chain (POAC) having a terminal carboxylic acid group (TPOAC acid) or terminal hydroxy group (TPOAC alcohol). Preferred basic dispersants are obtained by reaching one or more TPOAC acids with a polyamine or polyimine such as polyethyleneimine and preferred anionic dispersants are prepared by forming a phosphate ester of a TPOAC alcohol.

22 Claims, No Drawings

DISPERSANTS

The present invention relates to novel dispersants, to dispersions containing such dispersants together with a particulate solid and a liquid medium, to millbases and the use of such dispersants and millbases in paints, printing inks and plastics materials, including inks for non-impact printers such as "drop-on-demand" (DOD) printers.

Dispersants which contain a polyester chain moiety derived from one or more hydroxycarboxylic acids or lactones thereof have been known for a long time. These are generally of two distinct chemical types. In the first type, the hydroxycarboxylic acid or lactone is polymerised in the presence of an alkylcarboxylic acid as polymerisation terminating group to give a polyester having a free carboxylic acid which is then reacted with an amine such as polyethyleneimine. Early examples of such dispersants are disclosed in EP 158406. In the second type of dispersant, the hydroxycarboxylic acid or lactone is polymerised in the presence of an aliphatic alcohol as polymerisation terminating group to give a polyester having a free hydroxyl group which is subsequently converted to a phosphate ester. Early examples of such dispersants are disclosed in EP 164817. More recently, the properties of such dispersants have been improved by branching the alkylene group of the polyester chain as disclosed, for example, in WO 98/19784. However, none of these disclosures envisage any advantage in using polymerisation terminating groups which contain a branched alkyl chain.

Fibre lubricants have been disclosed in U.S. Pat. No. 5,980,772 which are fatty amine salts of phosphate esters of polyesters obtained from ε-caprolactone and isostearic acid as polymerisation terminating group. In one fibre lubricant the polyester precursor is isostearyl alcohol reacted with 10 moles of ε-caprolactone and in the other fibre lubricant isostearyl alcohol is reacted with 8 moles of ethyleneoxide followed by 15 moles of ε-caprolactone. No advantage is disclosed or envisaged over analogous fibre lubricants derived from linear alcohols as polymerisation terminating group.

It has now been found that superior dispersants may be obtained where the polymerisation terminating group contains a branched aliphatic chain.

According to the invention there is provided a dispersant of formula 1

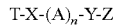   1 wherein
T is optionally substituted branched alkyl or cycloalkyl;
A is oxyalkylenecarbonyl and/or oxyalkenylenecarbonyl;
X and Y are, independently, a divalent linkage or a direct bond;
Z is an acid or basic group or a moiety containing an acid or basic group; and n is from 2 to 100, including salts thereof except where the dispersant is a phosphate ester of either isostearyl alcohol reacted with 10 moles of ε-caprolactone or isostearyl alcohol reacted with 8 moles of ethyleneoxide and 15 moles of ε-caprolactone.

T may be the residue of an optionally substituted aliphatic alcohol, T-OH, the residue of an optionally substituted aliphatic mercaptan, T-SH, the residue of an optionally substituted amine T-NHR wherein R is preferably hydrogen or $C_{1-20}$-alkyl or the residue of an optionally substituted aliphatic acid, T-COOH wherein T is a branched aliphatic chain or alicyclic ring. Preferably, T is the residue of a branched aliphatic chain which may be unsaturated but is preferably saturated. Preferably T contains from 3 to 50 carbon atoms more preferably from 6 to 36 carbon atoms and especially from 6 to 24 carbon atoms.

When T is substituted, the substituent is preferably halogen, $C_{1-6}$-alkoxy or tertiary amino. Preferably T is unsubstituted.

It is much preferred that T is the residue of an aliphatic alcohol, T-OH or the residue of an aliphatic carboxyl acid, T-COOH Examples of T-OH are isopropanol, isobutanol, tert-butanol, 2-ethylbutanol, 3-heptanol, 2-ethylhexanol, 3,5,5-trimethylhexanol, 3,7-dimethyloctanol and the so-called Guerbet alcohols such as those which are commercially available under the trade name Isofol (ex Condea GmbH) including mixtures thereof. Specific examples of Guerbet alcohols are Isofol 12, 14T, 16, 18T, 18E, 20, 24, 28, 32, 32T and 36.

Examples of T-NHR are 1,5-dimethylhexylamine, tert-octylamine, 2-ethylhexylamine, di-isopropylamine, 2-methylbutylamine, 1-ethylpropyl amine, bis(2-ethylhexylamine), 1,3-dimethylbutylamine, 3,3-dimethylbutylamine, 2-aminoheptane and 3-aminoheptane.

T may also be the residue of an alicyclic compound such as cyclohexylamine, cyclohexylmercaptan and cyclohexanol.

Examples of T-COOH are 2-ethylbutyric, 2-ethylhexanoic, 2-butyloctanoic, 2-hexyldecanoic, 2-octyldodecanoic and 2-decyltetradecanoic acids. Branched aliphatic acids of this type are available under the trade mark Isocarb (ex Condea GmbH) and specific examples are Isocarb 12, 16, 20, 28, 32, 34T and 36. T-COOH may be a single carboxylic acid or may be a mixture of such acids.

A is preferably oxy-$C_{1-30}$-alkenylene and especially oxy-$C_{1-30}$-alkylene and may be linear or branched and is especially a mixture of such groups. The chain moiety represented by -(A)$_n$- is a polyoxyalkylenecarbonyl chain and/or a polyoxyalkenylene carbonyl chain and is referred to hereinafter as a POAC chain. It is prepared by the (co)polymerisation of a hydroxycarboxylic acid or lactone thereof.

The POAC chain may be attached to the residue T-X— by either a carbonyl group or an oxygen atom. When T-X— is linked to -A- by a carbonyl group of the POAC chain, the residue T-X— is derived from an alcohol T-X—OH as polymerisation terminating group. When T-X— is linked to -A- by an oxygen atom of the POAC chain, the residue T-X— is derived from a carboxylic acid T-X—COOH as polymerisation terminating group.

The compound formed by the (co)polymerisation of a hydroxycarboxylic acid or lactone thereof in the presence of T-X—OH is of formula 2

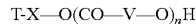   2 and is referred to hereinafter as a TPOAC alcohol.

The compound formed by the (co) polymerisation of a hydroxycarboxylic acid or lactone thereof in the presence of T-X—COOH is of formula 3

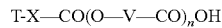   3 and is referred to hereinafter as a TPOAC acid

In formula 2 and 3, V represents $C_{1-30}$-alkylene and/or $C_{1-30}$-alkenylene.

Examples of hydroxycarboxylic acids are glycolic acid, lactic acid, hydroxyvaleric acid, hydroxycaproic acid, ricinoleic acid, 12-hydroxystearic acid, 12-hydroxydodecanoic acid, 5-hydroxydodecanoic acid, 5-hydroxydecanoic acid and 4-hydroxydecanoic acid.

Examples of suitable lactones are β-propiolactone, optionally alkyl substituted ε-caprolactone and optionally alkyl substituted δ-valerolactone. The alkyl substituent in ε-caprolactone and δ-valerolactone is preferably $C_{1-6}$-alkyl and especially $C_{1-4}$-alkyl and may be linear or branched. The alkyl substituted ε-caprolactone may be obtained by the oxidation of alkyl substituted cyclohexanone as described in WO 98/19784 and some are obtained as mixtures. Examples of alkyl substituted ε-caprolactone are 7-methyl, 3-methyl, 5-methyl, 6-methyl, 4-methyl, 5-tert-butyl, 4,6,6-trimethyl and 4,4,6-trimethyl ε-caprolactone. An example of alkyl substituted δ-valerolactone is β-methyl-δ-valerolactone. Preferred lactones are ε-caprolactone and δ-valerolactone.

Preferred POAC chains are those obtained from ricinoleic acid, 12-hydroxystearic acid and ε-caprolactone (optionally containing δ-valerolactone). It is especially preferred that the POAC chain is derivable from ε-caprolactone itself or ε-caprolactone and δ-valerolactone. The molar ratio of ε-caprolactone to δ-valerolactone is preferably from 20:1 to 1:5, more preferably from 12:1 to 1:2, even more preferably from 8:1 to 1:1 and especially from 5:1 to 1:1.

Preferably n is not greater than 70, more preferably not greater than 50 and especially not greater than 20.

When X is a divalent group it may be the residue of a diol or polyol, dicarboxylic acid or di-isocyanate. Thus, for example, when T is the residue of an alcohol, T-OH, and A is the residue of POAC chain having a terminal hydroxy group, T-OH may be linked to the POAC chain via a dicarboxylic acid or anhydride or by di-isocyanate. Examples of suitable dicarboxylic acids or anhydrides are phthalic acid, adipic acid, phthalic anhydride and succinic anhydride. Examples of suitable di-isocyanates are tolylene di-isocyanate and hexyl di-isocyanate.

When X is a diol, it may link T-COOH with a POAC chain containing a terminal carboxylic acid group. Examples of suitable diols are those derivable from ethylene oxide and/or propyleneoxide, and/or polytetrahydrofuran such as ethyleneglycol and propylene glycol.

The group X may also be a polyether obtainable by reacting T-OH with a $C_{2-6}$-alkyleneoxide, especially a $C_{2-3}$-alkyleneoxide such as propyleneoxide and/or ethyleneoxide. Preferably the alkyleneoxide is ethyleneoxide. Examples of the residue T-OH reacted with an ethyleneoxide are Guerbet alcohols reacted with ethyleneoxide, especially those having a number average molecular weight of from 250 to 750.

Preferably X is a direct bond or the residue of a polyether.

When Y is a divalent linking group it may be the residue of a diol or polyol, dicarboxylic acid or di-isocyanate as disclosed hereinbefore for X. It may also be the residue of an ethylenically unsaturated group linking Z with a POAC chain when Z is a basic group or a moiety containing a basic group. Preferred residues containing an ethylenically unsaturated group contain a hydroxy group and are preferably derived from (meth)acrylic acid. Examples of compounds containing an ethylenically unsaturated group and a hydroxy group are hydroxyethyl(meth)acrylate, hydroxypropyl (meth)acrylate, hydroxybutyl(meth)acrylate, polyethyleneglycolmono(meth)acrylate, polypropyleneglycolmono(meth) acrylate, polyethyleneglycol-polytetramethyleneglycolmono(meth)acrylate and polypropyleneglycol-polytetramethyleneglycolmono(meth) acrylate (e.g. Blemmer P E, Blemmer P P from Nihon Yushi Co Ltd). Preferably the ethylenically unsaturated group is derivable from hydroxyethyl(meth)acrylate.

When Z is an acidic group or moiety which contains an acidic group it is preferably sulphonate, sulphate, phosphonate or phosphate. Preferably Z is the residue of a phosphate ester.

When Z is a basic group or moiety which contains a basic group the basic group is preferably an amine, polyamine or polyimine. Examples of suitable amines are ethylenediamine, diethylene triamine, triethylene tetramine, tetraethylene pentamine, penta ethylene hexamine, N,N'-dimethylethylenediamine, piperazine, 2-methylpiperazine. 2,5-dimethylpiperazine, 1,4-bis(3-aminopropyl) piperazine, N-aminoethylpiperazine, isophoronediamine, polyoxypropylenediamine, polyoxyethylenediamine, bis(4-amino-3-methyldicyclohexyl)methane, diaminodicyclohexylmethane, bis(aminomethyl) cyclohexane, m-xylylenediamine, α-(m-aminophenyl)ethylamine, α-(p-aminophenyl)ethylamine, m-phenylenediamine, diaminodiphenylmethane, diaminodiphenylsuphone and norbornanediamine.

Z may also be the residue of a substituted aliphatic tertiary amine such as 3-dimethylaminopropylamine and N,N-dimethylethanolamine.

Examples of polyamines are polyvinylamine and polyallylamine.

The polyimine is preferably poly($C_{2-6}$-alkyleneimine) and especially polyethylene imine (hereinafter PEI). The polyimine may be linear or preferably branched. Linear polyethyleneimines can be prepared by hydrolysis of poly (N-acyl) alkyleneimines as described, for example, by Takeo Saegusa et al in Macromolecules, 1972, Vol: 5, page 4470. The branched polyethyleneimines of differing molecular weights are commercially available from BASF and Nihon Shokubai. Polyallylamine and poly-(N-alkyl) allylamines of differing molecular weights are commercially available from Nitto Boseki. Polyvinylamine of differing molecular weights are available from Mitsubishi Kasai. Poly(propyleneimine) dendrimers are commercially available from DSM Fine Chemicals and poly(amidoamine) dendrimers are available as "Starburst" dendrimers from Aldrich Chemical Co.

When Z is a basic group or a moiety containing a basic group, it is preferably the residue of polyallylamine, polyvinylamine and especially polyalkyleneimine such as PEI.

The number average molecular weight of the polyamine or polyimine is preferably from 500 to 600,000, more preferably from 1,000 to 200,000, even more preferably from 1,000 to 100,000, and especially from 1200 to 100,000.

When Z is polyfunctional there may be more than one group T-X-$(A)_n$-Y— attached to each Z and each chain segment represented by T-X-$(A)_n$-Y may be the same or different. Thus, for example, when Z is an acid group or residue containing an acid group such as a phosphate ester, the dispersant may be obtainable by reacting different TPOAC alcohols of formula 2 with a phosphating agent. Similarly, when Z is a basic group or moiety which contains a basic group such as a polyamine or polyimine (e.g. PEI), one or more TPOAC acids of formula 3 may be reacted with the polyamine or polyimine and the TPOAC acids may be the same or different.

In a first aspect of the invention, the dispersant is of formula 1 wherein Z is a moiety which contains a basic group and both X and Y are direct bonds.

According to a first aspect of the invention, the dispersant comprises a polyvinylamine, polyallylamine or especially a poly($C_{2-4}$-alkyleneimine) (hereinafter "PAI") carrying at least two POAC chains of Formula 4.

T-CO—(O—V—CO)—$_n$      4 wherein:

—O—V—CO— is a POAC chain moiety represented by A in formula 1; and

T and n are as defined hereinbefore and X and Y of formula 1 are both direct bonds.

For clarity, the oxygen and carbonyl groups in the POAC chain of Formula 4 have been included to indicate the manner of attachment of the group T and do not represent additional oxygen or carbonyl groups over and above those present in the oxyalkylene carbonyl group -(A)$_n$ Each POAC chain is preferably linked to the polyallylamine, polyvinylamine or PAI through either a covalent amide link —CO—N< formed between a terminal carbonyl group of the POAC chain and the nitrogen atom of a primary or secondary amino group in the polyallylamine, polyvinylamine or PAI, or through an ionic salt link —COO$^-$HN$^+$≡ formed between a terminal carboxylate group of the POAC chain and a positively charged nitrogen atom of a substituted ammonium group in the polyallylamine, polyvinylamine or PAI. Because the dispersant contains at least two POAC chains it may contain a mixture of amide and salt links depending on the severity of the reaction conditions used in its preparation.

The dispersant of the first aspect of the invention may be conveniently represented by the general Formula 5

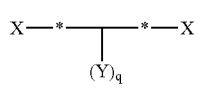
                                          (5)

wherein:

X-*-*-X represents polyvinylamine, polyallylamine or PAI;

Y represents a POAC chain linked to polyallylamine, polyvinylamine or PAI via an amide or salt linkage;

q is from 2 to 2000; and

PAI and POAC are as defined hereinbefore.

Preferably q is not less than 4 and especially not less than 10. It is also preferred that q is not greater than 1000 and preferably not greater than 500.

It is also preferred that the weight ratio of the POAC chain represented by Y to the polyallylamine, polyvinylamine or PAI represented by X-*-*-X is between 30:1 and 1:1, more preferably between 20:1 and 5:1 and especially between 17:1 and 7:1.

The PAI is preferably a poly(ethyleneimine) which may be linear or branched (hereinafter PEI).

The PAI preferably has a number-average molecular weight from 500 to 600,000, more preferably from 1,000 to 200,000, even more preferably from 1,000 to 100,000 and especially from 1,200 to 100,000.

Preferably the POAC chain represented by Y is obtainable from 12-hydroxystearic acid, ricinoleic acid or optionally alkyl substituted ε-caprolactone or δ-valerolactone, including mixtures thereof. In a particularly preferred variant, Y is obtainable from optionally alkyl substituted ε-caprolactone and δ-valerolactone and especially from ε-caprolactone and δ-valerolactone.

A further variant on the first aspect of the invention is a dispersant of formula 5 which contains two or more different POAC chains represented by (Y)$_q$. These chains may be of different hydrophilicity/hydrophobicity depending on the nature of the particulate solid to be dispersed and the nature of the liquid medium. Thus, when for example, the dispersant of formula 5 contains only two different POAC chains, POAC 1 and POAC 2, POAC 1 may be derivable from one or more hydroxycarboxylic acids at least one of which is hydroxy-$C_{8-30}$alkylene carboxylic acid or hydroxy-$C_{8-30}$alkenylene carboxylic acid and the other(s) is a hydroxy-$C_{1-6}$-alkylene carboxylic acid or lactone thereof including mixtures thereof and POAC 2 may be derivable from a hydroxy-$C_{1-6}$-alkylene carboxylic acid including mixtures thereof. As specific examples, POAC 1 may be obtainable from 12-hydroxystearic acid alone, ricinoleic acid alone, ricinoleic acid with ε-caprolactone or 12-hydroxystearic acid with ε-caprolactone and POAC 2 may be obtainable from ε-caprolactone alone or a mixture of ε-caprolactone and δ-valerolactone.

The dispersant of the first aspect of the invention is obtainable by reacting polyvinylamine, polyallylamine or a PAI with a TPOAC acid of Formula 4 or by reacting polyallylamine, polyvinylamine or a PAI with a lactone(s) in the presence of a polymerisation terminating compound.

The dispersant may be derived from polyvinylamine, polyallylamine or a PAI having at least two primary, secondary or tertiary amino groups and a TPOAC acid, in which case the reaction product of the amino groups in polyvinylamine, polyallylamine or the PAI and the terminal carboxy group of the POAC acid forms an amide or salt link. If the PAI contains tertiary amino groups, only salt links can be formed, otherwise salt and/or amide links are formed depending on the reaction conditions. Generally, mild reaction conditions such as low temperatures and/or short reaction times promote the formation of salt links and more severe reaction conditions such as high temperature and/or long reaction times promote the formation of amide links in a manner which is familiar to skilled chemists.

When the dispersant of the first aspect of the invention contains free amino groups these may be converted into substituted ammonium groups by reaction with an acid or a quaternising agent so that the dispersant is in the form of a substituted ammonium salt. Suitable reagents for this purpose are mineral and strong organic acids or acidic salts such as acetic acid, sulphuric acid, hydrochloric acid, alkyl sulphonic acids, alkyl hydrogen sulphates and aryl sulphonic acids including acid forms of dyestuffs and pigments and quaternising agents such as dialkylsulphates, for example dimethylsulphate (DMS) and alkyl halides such as methyl and ethyl chloride.

The dispersants of the first aspect of the invention are obtainable by reacting polyvinylamine, polyallylamine or PAI with a TPOAC acid or lactone precursor(s) thereof at a temperature between 50 and 250° C., preferably in an inert atmosphere and optionally in the presence of an esterification catalyst. Preferably, the temperature is not less than 80° C. and especially not less than 100° C. In order to minimise charring of the dispersant the temperature is preferably not greater than 150° C.

The inert atmosphere may be any gas which does not react with the final product or starting materials and includes the inert gases of the Periodic Table and especially nitrogen.

When the dispersant is prepared in a single stage by reacting polyvinylamine, polyallylamine or PAI, polymerisation terminating agent T-COOH and lactone(s) it is preferable to include an esterification catalyst such as tetra-alkyl titanate, for example tetrabutyl titanate, zinc salt of an organic acid, for example, zinc acetate, zirconium salt of an aliphatic alcohol, for example zirconium isopropoxide, toluene sulphonic acid or a strong organic acid such as haloacetic acid, for example trifluoroacetic acid. Zirconium isopropoxide is preferred. When the dispersant of the first aspect of the invention is prepared by a single stage process, higher temperature may be required and these are typically from 150-180° C.

It is preferred to prepare the TPOAC acid separately, prior to reacting it with polyvinylamine, polyallylamine or PAI. In this case, the lactone(s) and polymerisation terminating agent are reacted together in an inert atmosphere at 150-180° C. in the presence of an esterification catalyst. The subsequent reaction of the TPOAC acid with polyvinylamine, polyallylamine or PAI may then be carried out at temperatures of 100-150° C.

Where the PAI is PEI, the weight ratio of TPOAC acid to PEI can be varied between wide limits depending whether the dispersant is ultimately to be used to disperse a particulate solid in a polar or non-polar organic medium. Useful results have been obtained using dispersants where the weight ratio of TPOAC acid to PEI is from 30:1 to 1:1, preferably from 20:1 to 5:1 and especially from 17:1 to 7:1.

According to a second aspect of the invention there is provided a dispersant of Formula 1 wherein Z is an acidic group or moiety which contains an acidic group selected from carboxylate, sulphate, sulphonate, phosphate and phosphonate.

A preferred dispersant of the second aspect of the invention is a compound of Formula 6.

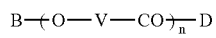
(6)

wherein:
B and D are groups, one of which is or carries the acidic group and the other is a branched aliphatic chain.
V and n are as defined hereinbefore.

In the dispersant of Formula 6, when D carries the acidic group, B is preferably the group T-CO— of an esterifiable carboxylic acid of formula T-COOH. In this case, D is preferably a polyvalent, more preferably a di- or tri-valent, bridging group linking the acid group to the POAC chain and is preferably of the formula -K-G-J- wherein K is O, S, NR or a direct link and J is O, NR, a Polyether or a direct link in which R is H, alkyl, alkenyl, cycloalkyl or phenyl or where K and J are both NR, the two groups R may form a single alkylene or alkenylene group linking the two nitrogen atoms to which they are attached, and G is alkylene, alkenylene, cycloalkylene or arylene. The alkyl or alkenyl group in -K-G-J- preferably contains up to 20 carbon atoms and the cycloalkyl group preferably contains from 4 to 8 carbon atoms.

In the compound of Formula 6, when B carries the acidic group, D is preferably the residue of an alcohol, thiol or primary or secondary amine, T-K-H in which T is a branched aliphatic or alicyclic group. In this case, B is preferably the acidic group itself and the POAC chain carries a terminal hydroxy group. This hydroxy group may be esterified to give a sulphate or phosphate group by reacting with a suitable sulphating or phosphating agent when the dispersant may contain one or more sulphate or phosphate ester groups, including mixtures.

Phosphate groups are preferred, and the preferred phosphating agent is $P_2O_5$, $POCl_3$ or polyphosphoric acid.

Preferably, the group represented by B or D which is remote from the acidic group contains at least 6 and more preferably at least 10 carbon atoms.

The acidic group in the second aspect of the invention may be in the free acid form or it may be present as a salt with a base such as ammonia, an amine, an aminoalcohol or an inorganic metal such as an alkali metal or alkaline earth metal.

One preferred dispersant of the second aspect of the invention is of general Formula 7.

(7)

wherein:
T, V and n are as defined hereinbefore.

A second preferred dispersant of the second aspect of the invention is of general Formula 8.

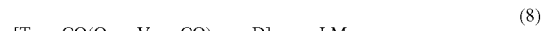
(8)

wherein:
L is phosphonate, sulphonate or methylene carboxylate;
M is a cation;
w is 1 or 2; and
T, V, D, n and p are as defined hereinbefore.

An especially preferred dispersant of the second aspect of the invention is of general Formula 9.

(9)

wherein:
$L^1$ is sulphate or phosphate; and
T, J, V, M, n and w are as defined hereinbefore.
Preferably J is oxygen or a polyether.

This corresponds to a dispersant of Formula 1 wherein: Z is an acid group, X is a direct bond or a divalent linkage and Y is a direct bond.

Examples of the bridging group represented by D are —$NHC_2H_4$—, —$OC_2H_4$—, —$OC_2H_4O$—, —$OC_2H_4NH$—, —$NH(CH_2)_zNH$ where z is from 2 to 5, piperazin-1,4-ylene and diaminophen-1,4-ylene.

An especially preferred variant on the dispersants of formula 9 is where T is linked to the POAC chain —(CO—V—O)— via the residue of a polyether and particularly the residue of a polyethyleneglycol.

The dispersants of the second aspect of the invention are obtainable by reacting a POAC acid having terminal hydroxy and carboxylic acid groups or a POAC acid which has a polymerisation terminal group and a hydroxy or carboxylic acid group (TPOAC compound) with a compound having a group reactive therewith and carrying a terminal acidic group. Alternatively, the POAC acid or TPOAC compound may be reacted directly with a precursor of the acidic group or with a bifunctional compound which is subsequently reacted with a precursor of the acidic group. In the above processes the POAC acid or TPOAC compound may be prepared in situ from a lactone(s) or a lactone(s) and polymerisation terminal compounds and converted directly to the dispersant of the second aspect of the invention. Suitable compounds containing the acidic group are α-amino- or α-hydroxy alkane carboxylic acids, such as glycine and glycolic acid and amino-hydroxy-organic sulphonic or phosphonic acids, such as amino ethane sulphonic acid. Suitable precursors of the acidic group itself are $P_2O_5$ and polyphosphoric acid. Suitable bifunctional compounds which can form a linking group between the POAC acid or TPOAC compound and the acidic group are polyamines, polyols and hydroxyamines.

The dispersant of Formula 7 is obtainable by the polymerisation of a lactone(s) to give a POAC chain which is subsequently reacted with a carboxylic acid T-COOH or by polymerising the lactone(s) in the presence of T-COOH which acts as polymerisation terminal compound.

The POAC acid or lactone(s) precursor thereof may be reacted with T-COOH in a suitable hydrocarbon solvent such as toluene or xylene which can form an azeotrope with the water produced in the esterification reaction. The reaction is preferably carried out in an inert atmosphere such as nitrogen at a temperature between 80° and 250°, preferably from 150 to 180° C. Preferably, the reaction is carried out in the presence of an esterification catalyst as defined hereinbefore.

The dispersant of the second aspect of the invention is also obtainable by reacting a compound of Formula 7 with an appropriate co-reactant which also contains at least one acidic group and which is capable of reacting with the carboxylic acid group of the compound of Formula 7. Examples of groups capable of reacting with the carboxylic acid group are amines and hydroxy groups. Examples of co-reactants are amino-acids such as glycine and short chain hydroxy acids such as glycolic or lactic acid.

The dispersant of the second aspect of the invention is also obtainable by an indirect, two-stage process in which the compound of Formula 7 is reacted with a linking compound containing at least one reactive group which reacts with a carboxylic acid group such as hydroxy or amino and at least one other reactive group and the intermediate product so obtained is then reacted with a compound containing the acidic group and a group capable of reacting with said other reactive group of the linking compound. Suitable linking compounds include polyols, diamines and hydroxy amines such as ethylene glycol, propylene glycol, glycerol, trimethylol propane, pentaerythritol, sorbitol, ethylenediamine, trimethylenediamine, hexamethylenediamine, diethylenetriamine, ethanolamine, diethanolamine, dipropanolamine and tris(hydroxymethyl) aminomethane. Hydroxyamine linking compounds are preferred because of the different reactivities of the hydroxy and amino groups which reduces the formation of oligomeric intermediate products. Suitable linking compounds containing an acidic group and said other reactive group with which the compound of Formula 6 reacts include strong inorganic acids such as phosphoric acid, sulphuric acid, chlorosulphonic acid and sulphamic acid and organic salts such as alkyl- and aryl-phosphonic acids, alkyl- and aryl-sulphonic acids and monochloroacetic acid.

In preparing the dispersant of the second aspect of the invention from the compound of Formula 7, the reaction of the latter with the compound containing the acidic group (in the direct route) or with the linking compound (in the indirect route) is carried out under conditions which are appropriate to the reactants involved. Thus, in the case where the compound of Formula 7 is reacted directly with a functional acid such as glycine or glycolic acid the reactants may be heated together at a temperature from 180 to 250° C., if desired in the presence of a solvent such as xylene and also optionally in the presence of an esterification catalyst as hereinbefore defined until the acid value of the reaction mix has fallen to the appropriate level. The reactants are preferably used in approximately stoichiometric amounts with respect to the carboxy group in the compound of Formula 7 and the hydroxy or amino group in the compound bearing the acidic group. Similar conditions apply, in the case of the indirect route, to the reaction between the compound of Formula 7 and the linking compound, except that only one reactive group in the latter is utilised to ensure that the resulting intermediate product still contains said other reactive group available for subsequent reaction with the compound bearing the acidic group. When the linking compound is a hydroxyamine, the reaction temperature is preferably from 150 to 200° C. Here again, an inert solvent or diluent and/or catalyst may be present, if desired.

In the second stage of the indirect route, the intermediate product is reacted with the compound bearing the acidic group at a temperature and for a period of time sufficient for completion of the reaction as indicated by the attainment of a substantially constant acid value of the reaction mixture. When the compound containing the acidic group is a polybasic acid such as phosphoric acid or sulphuric acid, it is preferred that one or two, especially one, of the ionisable hydrogen atoms therein is reacted and that no attempt is made to remove the water formed in the reaction. Normally, the reaction is complete in about 3 hours at 40 to 70° C.; more stringent conditions are preferably avoided because of the risk of dehydration of the product, especially when sulphuric acid is used. These complications do not arise in the case of monochloroacetic acid, but the reaction proceeds more slowly and rather more forcing conditions are required. In general, the compound containing the acidic group is used in approximately stoichiometric amounts with respect to the available reactive group in the precursor but a lower or higher amount may be used, if desired.

The dispersant of Formula 8, in which J is a direct link, is obtainable by reacting a POAC acid having a terminal carboxylic acid group with an amino- or hydroxy-organic sulphonate and preferably an amino- or hydroxy alkyl phosphate. The dispersant of Formula 8 wherein J is NR or oxygen is obtainable by reacting a POAC acid with a diol or hydroxamino compound, such as an amino alcohol, and subsequently reacting the terminal hydroxy group of the intermediate formed with a phosphating agent such as $P_2O_5$ or polyphosphoric acid, or with a sulphonating agent, such as chlorosulphonic acid.

The dispersant of Formula 8, wherein K is a direct link, is obtainable by reacting a TPOAC acid of Formula 10

$$T\ CO(O\!-\!V\!-\!CO)_{n'_p}\!-\!OH \qquad (10)$$

with a compound of Formula 11

$$(H\text{-}K\text{-}G)_w LM \qquad (11)$$

wherein

T, V, K, G, L, M, n, p and w are as defined hereinbefore.

The dispersant of Formula 8 wherein K is O or NR is obtainable by reacting a TPOAC acid of Formula 10 with a compound of Formula 12

$$H\text{-}K\text{-}G\text{-}O\text{-}H \qquad (12)$$

and subsequently reacting with a sulphating or phosphating agent.

The especially preferred dispersant of Formula 9 is obtainable by polymerising a lactone(s) in the presence of a monohydric alcohol or mono-amine to form a TPOAC alcohol having a terminal hydroxy group i.e. a POAC chain having a terminal hydroxy group and a polymerisation terminal group. Monohydric alcohols are preferred, especially those having up to 50 and more especially those having up to 36 carbon atoms. The TPOAC alcohol is subsequently reacted with a phosphating or sulphating agent. Phosphating agents are preferred, especially $P_2O_5$ and polyphosphoric acid.

The TPOAC alcohol is obtainable by reacting a lactone(s) with a monohydric alcohol under similar conditions to those used to prepare a TPOAC acid.

The dispersant which is a phosphate ester of Formula 9 is obtainable by reacting a TPOAC alcohol with a phosphating agent wherein the ratio of the alcohol to each phosphorus atom of the phosphating agent is from 3:1 to 1:1 and especially from 2:1 to 1:1. It is especially preferred that the ratio of each TPOAC alcohol to each phosphorus atom of the phosphating agent is less than 2, for example, about 1.5:1 when the dispersant is a mixture of mono- and di-phosphate esters.

The reaction between the TPOAC alcohol and phosphating agent is preferably carried out in an inert atmosphere such as nitrogen under anhydrous conditions. The reaction may be carried out in an inert solvent but is more convenient to react the TPOAC alcohol with the phosphating agent in the absence of a solvent. The reaction temperature is preferably above 60 and especially above 80° C. In order to avoid charring the dispersant, the temperature is preferably less than 120 and especially less than 110° C.

As a less preferred variant, the dispersant of Formula 8 may also be prepared by reacting a monohydric alcohol with a pre-formed POAC acid and subsequently reacting the TPOAC alcohol with a phosphating or sulphating reagent.

The dispersants of the second aspect of the invention may contain additional ester, amide or amine salt groups formed by reacting the dispersant bearing an acidic group with an alcohol or alkanolamine.

The dispersants of the second aspect of the invention may be in the form of a free acid or it may form a salt with an alkali metal, ammonia, an amine, alkanolamine or quaternary ammonium salt. The dispersant of the second aspect of the invention is preferably in the form of a salt with an amine. Examples of suitable amines are n-butylamine, ethanolamine, aminopropanol, diethanolamine and dimethylaminopropylamine.

The dispersant of the first aspect of the invention may also be in the form of a salt with a coloured acid. By the term "coloured acid" is meant an organic pigment or dyestuff containing at least one, preferably from 1 to 6 acid groups, especially sulphonic, phosphonic or carboxylic acid groups. A preferred coloured acid is copper phthalocyanine or other deeply coloured pigment and especially sulphonated copper phthalocyanine containing, on average, from 0.5 to 3 sulphonic acid groups per molecule.

According to a still further aspect of the invention there is provided a dispersant containing one or more amine or imino groups, a POAC chain having a branched alkyl or cycloalkyl polymerisation terminating group and a residue of an ethylenically unsaturated chain wherein the POAC chain is attached to the amino and/or imino group via the ethylenically unsaturated chain, including salts thereof.

Preferably the amino or imino group is the residue of polyallylamine, polyvinylamine and especially PAI, for example PEI.

In a preferred aspect of the invention, the dispersant is of formula 5 wherein Y represents a chain residue of formula 13.

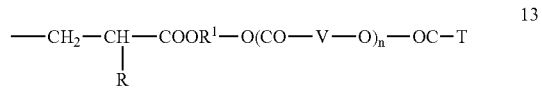

wherein

R is H or $C_{1-4}$-alkyl;

$R^1$ is an aliphatic or aromatic residue containing up to 10 carbon atoms which optionally contains a polyether residue derivable from propyleneoxide and/or ethyleneoxide; and T, V and n are as defined hereinbefore.

When R is $C_{1-4}$-alkyl it is preferably methyl.

$R^1$ is preferably $C_{2-6}$-alkylene and especially $C_{2-4}$-alkylene.

This corresponds to a dispersant of formula 1 wherein Z is a moiety which contains a basic group, X is a direct bond and Y is a divalent linkage The dispersants containing a chain residue of formula 13 can be conveniently prepared by the Michaels addition reaction of an amine, imine, polyamine or polyimine to a compound of formula 14.

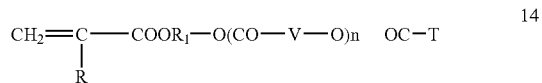

wherein R, $R^1$ T, V and n are as defined hereinbefore.

The compounds of formula 14 can be conveniently prepared by reacting on (alk) acrylic acid containing a hydroxy group with either a pre-formed TPOAC acid of formula 3 or with an acid T-COOH and one or more hydroxy carboxylic acids or lactones thereof at 50 to 150° C., preferably at 80 to 120° in the presence of air or oxygen. Preferably, the reaction is carried out in the presence of a catalyst such as tetra-alkyl titanate such as tetra butyltitanate, a metal alkoxide such as tetraisopropyltitanate, a tin catalyst such as stannous chloride, stannous octylate or monobutyltinoxide or an acid catalyst such as p-toluene sulphonic acid or trifluoroacetic acid. The reaction is also preferably carried out in the presence of a polymerisation inhibitor to prevent the self-polymerisation of the (alk) acrylic acid containing the hydroxy group. Examples of polymerisation inhibitors are (methyl)hydroquinine and phenothiazine. Oxygen also acts as a polymerisation inhibitor.

The reaction between the amine, imine, polyamine and polyimine and the compound of formula 14 is preferably carried out between 10 and 130° C., especially between 20 and 100° C. Stoichiometric amounts of the amine or imine and compound of is formula 14 may be used. However, in a preferred aspect of the invention the dispersants are obtainable by reacting an excess amount of the compound of formula 14 with a polyamine or polyimine such as PAI and especially PEI. The reaction between the amine, imine, polyamine or polyimine and compound of formula 14 may be carried out in a solvent which is inert to the reactants. The solvent may be aromatic or aliphatic such as toluene, xylene and Solvesso, ketones such as acetone, methylethylketone and methylisobutylketone, alkanols such as n-butanol and isopropanol and ethers such as dimethyladipate, dimethylsuccinate and dimethylglutarate.

Many of the intermediates used in the preparation of the dispersants according to the invention are novel, especially the TPOAC acid used to make dispersants of the first aspect of the invention and the TPOAC alcohol used to make the preferred dispersants of the second aspect of the invention.

Thus, according to the invention there is provided a TPOAC alcohol of Formula 2, a TPOAC acid of formula 3 and a compound of formula 14.

As noted hereinbefore, the dispersants are particularly useful for dispersing a particulate solid in an organic medium.

According to a further aspect of the invention there is provided a composition comprising a particulate solid and a dispersant of Formula 1.

According to a still further aspect of the invention there is provided a dispersion comprising a dispersant of Formula 1, a particulate solid and an organic medium.

The solid present in the dispersion may be any inorganic or organic solid material which is substantially insoluble in the organic medium at the temperature concerned and which it is desired to stabilise in a finely divided form therein.

Examples of suitable solids are pigments for solvent inks; pigments, extenders and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, fire retardants such as those used in plastics materials and biocides, agrochemicals and pharmaceuticals which are applied as dispersions in organic media.

A preferred solid is a pigment from any of the recognised classes of pigments described, for example, in the Third Edition of the Colour Index (1971) and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Other preferred solids are: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; agrochemicals such as the fungicides flutriafen, carbendazim, chlorothalonil and mancozeb and fire retardants such as aluminium trihydrate and magnesium hydroxide.

The organic medium present in the dispersions of the invention is preferably a polar organic medium or a substantially non-polar aromatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, aliphatic hydrocarbons such as hexane, heptane, octane, decane, petrolium distillates such as white spirit, mineral oils, vegetable oils and halogenated aliphatic and aromatic hydrocarbons, such as trichloro-ethylene, perchloroethylene and chlorobenzene.

Examples of suitable polar resins, as the medium for the dispersion form of the present invention, are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose. Examples of paint resins include short oil alkyd/melamine-formaldehyde, polyester/melamine-formaldehyde, thermosetting acrylic/melamine-formaldehyde, long oil alkyd and multimedia resins such as acrylic and urea/aldehyde.

The resin may also be an unsaturated polyester resin including the so-called sheet moulding compounds and bulk moulding compounds which may be formulated with reinforcing fibres and fillers. Such moulding compounds are described in DE 3,643,007 and the monograph by P F Bruins entitled "Unsaturated Polyester Technology", Gordon and Breach Science publishers, 1976, pages 211 to 238.

If desired, the dispersions may contain other ingredients, for example resins (where these do not already constitute the organic medium) binders, fluidising agents (such as those described in GB-A-1508576 and GB-A-2108143), anti-sedimentation agents, plasticisers, levelling agents and preservatives.

The dispersions typically contain from 5 to 95% by weight of the solid, the precise quantity depending on the nature of the solid and the quantity depending on the nature of the solid and the relative densities of the solid and the organic medium. For example, a dispersion in which the solid is an organic material, such as an organic pigment, preferably contains from 15 to 60% by weight of the solid whereas a dispersion in which the solid is an inorganic material, such as an inorganic pigment, filler or extender, preferably contains from 40 to 90% by weight of the solid based on the total weight of dispersion.

The dispersion is preferably prepared by milling the solid in the organic medium at a temperature which is not greater than 40° C. and especially not greater than 30° C. However, when the solid is a crude phthalocyanine pigment such as copper phthalocyanine and the dispersant is a compound of formula 1 wherein Z is a basic group or a moiety containing a basic group it is sometimes preferable to carry out the milling in an organic liquid at a temperature between 50 and 150° C. since greener and brighter shades may be obtained. This is particularly the case where the organic liquid is a high boiling aliphatic and/or aromatic distillate.

The dispersion may be obtained by any of the conventional methods known for preparing dispersions. Thus, the solid, the organic medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the dispersion.

If the composition is required in dry form, the liquid medium is preferably volatile so that it may be readily removed from the particulate solid by a simple separation means such as evaporation. It is preferred, however, that the dispersion comprises the liquid medium.

If the dry composition consists essentially of the dispersant and the particulate solid, it preferably contains at least 0.2%, more preferably at least 0.5% and especially at least 1.0% dispersant based on weight of the particulate solid. Preferably the dry composition contains not greater than 100%, preferably not greater than 50%, more preferably not greater than 20% and especially not greater than 10% by weight based on the weight of the particulate solid.

As described hereinbefore, the dispersants of the invention are particularly suitable for preparing mill-bases where the particulate solid is milled in a liquid medium in the presence of both a particulate solid and a film-forming resin binder.

Thus, according to a still further aspect of the invention there is provided a mill-base comprising a particulate solid, dispersant and a film-forming resin.

Typically, the mill-base contains from 20 to 70% by weight particulate solid based on the total weight of the mill-base. Preferably, the particulate solid is not less than 30 and especially not less than 50% by weight of the mill-base.

The amount of resin in the mill-base can vary over wide limits but is preferably not less than 10%, and especially not less than 20% by weight of the continuous/liquid phase of the mill-base. Preferably, the amount of resin is not greater than 50% and especially not greater than 40% by weight of the continuous/liquid phase of the mill-base.

The amount of dispersant in the mill-base is dependent on the amount of particulate solid but is preferably from 0.5 to 5% by weight of the mill-base.

Dispersions and mill bases containing the dispersants of the invention are particularly suitable for use in paints, especially high solids paints, inks, especially flexographic, gravure and screen inks, and non-aqueous ceramic processes, especially tape-coating, doctor-blade, extrusion and injection moulding type processes.

The dispersants of the present invention exhibit advantage over known dispersants derived from ϵ-caprolactone. In particular, they exhibit superior solubility in organic media such as solvents and do not separate or crystallise when stored at 4° C. for lengthy periods. When stored at low temperatures, separation can occur at −24° C. but the dispersants readily re-dissolve on warming to 4-10° C. When incorporated into paints and painting inks, the dispersants of the present invention give rise to higher gloss readings lower haze values, lower viscosity and/or improved flocculation properties in the resultant paints and inks.

The invention is further illustrated by the following examples wherein all references to amounts are in parts by weight unless indicated to the contrary.

Intermediates for Amine Dispersants

In the title of the intermediates the components of the POAC chain and the branched alkyl polymerisation terminating group are as indicated. The figures following the components in the title compounds of the working examples indicate relative molar amounts. Thus, in Example 1, BuOc 1, ϵ-cap 12, δ-val 2 signifies that 1 mole 2-butyloctanoic acid is reacted with 12 moles ϵ-caprolactone and 2 moles δ-valerolactone.

EXAMPLE 1

BuOc 1, ϵ-cap 12, δ-val 2

2-Butyloctanoic acid (5.0 parts, 25 mM Isocarb 12 ex Condea), ϵ-caprolactone (34.18 parts, 300 mM ex Aldrich), δ-valerolactone (5.0 parts, 50 mM ex Fluka) were stirred at 180° C. for 6 hours under a nitrogen atmosphere in the presence of zirconium butylate (0.2 parts). On cooling, the product was obtained as a soft white solid (44 parts). This is Intermediate 1, number average molecular weight Mn=1304, polydispersity=1.43.

EXAMPLES 2 to 6

The intermediates listed in Table 1 below were prepared in similar manner to Intermediate 1 of Example 1 except using the molar values of the intermediates shown in the table.

TABLE 1

| Example | Intermediate | Alkyl end group | ε-cap | δ-val | Appearance | Mn | Pd |
|---|---|---|---|---|---|---|---|
| 2 | 2 | 2-HeDe 1 | 12 | 2 | pale yellow, soft solid | 1318 | 1.41 |
| 3 | 3 | 2-OcDo 1 | 12 | 3 | pale yellow, soft solid | 1873 | 1.47 |
| 4 | 4 | 2-DeTe 1 | 12 | 3 | pale yellow, soft solid | 1961 | 1.42 |
| 5 | 5 | 2-EtBu 1 | 12 | 3 | pale yellow, solid | 1681 | 1.46 |
| 6 | 6 | 2-EtHe 1 | 12 | 3 | pale yellow, solid | 1538 | 1.53 |

Footnote to Table 1
2-HeDe is 2-hexyldecanoic acid,
2-OcDo is 2-octyldodecanoic acid and
2-DeTe is 2-decyltetradecanoic acid, all ex Condea as Isocarb 16, Isocarb 20 and Isocarb 24, respectively.
2-EtBu is ethylbutyric acid and
2-EtHe is 2-ethylhexanoic acid both ex Aldrich
ε-cap is ε-caprolactone.
δ-val is δ-valerolactone
Mn is number average molecular weight
Pd is Polydispersity Preparation of Amine Dispersants

EXAMPLE 7

(BuOc 1, ε-cap 12, δ-val 2) PEI

Intermediate 1 (44 parts, 24 mM Example 1) and polyethyleneimine (3.3 parts, 0.33 mM, Mn=10,000 as SP 200 ex Nippon Shukubai) were stirred and heated under nitrogen at 120° C. for 6 hours. On cooling, the product was obtained as a pale yellow solid (43 parts). This is Amine Dispersant 1. The weight ratio of PEI to TPOAC acid is 1:13.

EXAMPLES 8 to 12

Example 7 was repeated except replacing Intermediate 1 with an equivalent weight of intermediate as shown in Table 2. All the amine dispersants listed in Table 2 have a weight ratio of PEI to TPOAC acid of 1:13.

TABLE 2

| Example | Amine Dispersant | Intermediate | TPOAC acid | Appearance |
|---|---|---|---|---|
| 8 | 2 | 2 | 2-HeDe 1, cap 12, val 2 | brown soft solid |
| 9 | 3 | 3 | 2-OcDo 1, cap 12, val 3 | pale yellow soft solid |
| 10 | 4 | 4 | 2-DeTe 1, cap 12, val 3 | pale yellow soft solid |
| 11 | 5 | 5 | 2-EtBu 1, cap 12, val 3 | pale yellow solid |
| 12 | 6 | 6 | 2-EtHe 1, cap 12, val 3 | pale yellow solid |

Footnote to Table 2
The legends under TPOAC acid are as explained in the footnote to Table 1.

EXAMPLE 9

13 (BuOc 1, cap 12, val 3): 1 PEI

2-Butyloctanoic acid (7.31 parts, 0.0365M ex Condea), ε-caprolactone (50 parts, 0.438M ex Aldrich) and δ-valerolactone (10.96 parts, 0.11M ex Fluka) were stirred at 140° C. under nitrogen. Zirconium butylate (0.3 parts ex Fluorochem) was added and the reactants were stirred together for 6 hours at 180-185° C. under a nitrogen atmosphere. The reaction mass was cooled to 90° C. and PEI (5.15 parts as SP200 with MW=20,000 ex Nippon Shokubai) was added and the reactants stirred under nitrogen for 6 hours at 120-125° C. The product was obtained as a pale yellow liquid which gave a yellow wax on cooling (69 parts). This is Amine Dispersant 7.

EXAMPLE 10

13 (HeDe 1, cap 12, val 3): 1 PEI

This was prepared in identical manner to the dispersant described in Example 9 except using 2-hexyl decanoic acid (9.36 parts, 0.0365M ex Condea) as the branched acid and 5.3 parts PEI. The product was obtained as a yellow wax (72 parts). This is Amine Dispersant 8.

EXAMPLE 11

13 (BuOc 1, cap 12): 1 PEI 2-butyloctanoic acid (7.31 parts, 0.0365 M ex Condea) and ε-caprolactone (50 parts, 0.438 m ex Aldrich) were stirred at 140° C. under nitrogen. Zirconium butylate (0.3 parts ex Fluorochem) was added and the reactants were stirred at 180-185° C. for 6 hours under nitrogen. The reaction mass was cooled to 90° C. and PEI (4.31 parts, SP200) was added and the reactants were stirred under nitrogen at 120-125° C. for 6 hours. The product was obtained as a yellow wax (57 parts). This is Amine Dispersant 9.

EXAMPLE 12

13 (HeDe 1, cap 12): 1 PEI

This was prepared in identical manner to the dispersant described in Example 11 except using 2-hexyl decanoic acid (9.36 parts, 0.0365 m) as the branched alkyl acid and 4.46 parts PEI. The product was obtained as a pale yellow wax (60 parts). This is Amine Dispersant 10.

Intermediates for Acid Dispersants

EXAMPLE 13

BuOc 1, cap 4, val 1

2-butyl-l-octanol (25 parts, 0.135 M as Isofol 12 ex Condea), ε-caprolactone (61.6 parts, 0.54 M ex Aldrich) and δ-valerolactone (13.5 parts, 0.135 M ex BASF) were heated to 120° C. and stirred under nitrogen. Zirconium butylate (0.25 parts ex Fluorochem) was added and the reactants were stirred for 6 hours at 180-185° C. under nitrogen. On cooling, the product was obtained as a clear colourless oil. This is Intermediate 7.

EXAMPLE 14

BuOc 1, cap 5

This was prepared in identical manner to that described in Example 13 except using 2-butyl-l-octanol (24.5 parts, 0.132 M) and ε-caprolactone (75.2 parts, 0.66 M). The product gave a soft white wax on cooling. This is Intermediate 8.

EXAMPLE A (Do 1, cap 4.4, val 1.5)

This was prepared in identical manner to that described in Example 13 except using dodecanol (124.1 parts, 0.6 M ex Aldrich), ε-caprolactone (301 parts, 2.64 M ex Aldrich) and δ-valerolactone (90.1 parts, 0.9 M ex Fluke). This product was obtained s a viscous oil. This is Intermediate A.

EXAMPLE B

Do 1, cap 6

This was also prepared in identical manner to that described in Example 13 except using dodecanol (73.4 parts, 0.394 M) and ε-caprolactone (262.7 parts, 2.36 M). The product was obtained as a white wax. This is Intermediate B.

Acid Dispersants

EXAMPLE 15

BuOc 1, cap 4, val 1 1:1 phosphorus

Intermediate 7 (50 parts ex Example 13) and polyphosphoric acid (5.89 parts, 83% w/w $P_2O_5$ ex Fluke) were stirred for 6 hours under nitrogen at 90° C. The product was obtained as a colourless oil. This is Acid Dispersant 1.

EXAMPLE 16

BuOc 1, cap 5 1:1 phosphorus

This was prepared in identical manner to that described in Example 15 except using Intermediate 8 (50 parts ex Example 14) and 5.7 parts polyphosphoric acid. The product was obtained as a white wax. This is Acid Dispersant 2.

EXAMPLE C (Do 1, cap 4.4, val 1.5 1:1 phosphorus

This was again prepared in identical manner to that described in Example 15 except using Intermediate A (100 parts ex Example A) and 10.85 parts polyphosphoric acid. The product was obtained as a clear oil. This is Acid Dispersant A.

EXAMPLE D

Do 1, cap 6 1:1 phosphorus

Again this was prepared in identical manner to that described in Example 15 except using Intermediate B (100 parts ex Example B) and 11.2 parts polyphosphoric acid. The product was obtained as a white waxy solid. This is Acid Dispersant B.

EXAMPLE 17

(OcDo 1, cap 9.5, val 3.5) 2.7:1 phosphorus/DEA salt

Zirconium butyate (0.2 parts ex ABCR) was added to a stirred mixture of 2-octyl-1-dodecanol (50 parts, 16.7 mM, Isofol 20 ex Condea), ε-caprolactone (18.15 parts, 159 mM ex Aldrich) and δ-valerolactone (5.87 parts, 59 mM ex Fluka) at 140° C. under nitrogen. The reactants were then stirred at 180° C. for 6 hours under nitrogen. The reaction mass was cooled to 90° C. and polyphosphoric acid (2.12 parts, 12.4 mM, 82% $P_2O_5$) was added and the reaction continued with stirring for 6 hours at 90° C. under nitrogen.

The acid value of an aliquot was found to be 57.37 mg KOH/gm.

The reactants were cooled to 80° C. and diethanolamine (3.12 parts, 29.7 mM ex Fisher) was added and the reactants stirred under nitrogen for 2 hours at 80° C. The product was obtained as an orange viscous liquid which gave a soft paste on cooling (26 parts). This is Acid Dispersant 3.

EXAMPLES 18 to 27

The following Acid Dispersants were prepared as diethanolamine salts in similar manner to that described in Example 17. In Table 3 the branched chain alcohol is recorded together with the molar ratios of branched chain alcohol to ε-caprolactone and δ-valerolactone.

TABLE 3

| Example | Acid Dispersant | Branched Alcohol | ε-cap | δ-val | Acid value of TPOAC alcohol | Appearance |
|---|---|---|---|---|---|---|
| 18 | 4 | TDOD | 9.5 | 3.5 | 52.2 | Pale yellow Soft paste |
| 19 | 5 | EtHe | 9.5 | 3.5 | 51.62 | Pale brown Soft paste |
| 20 | 6 | TMH | 9.5 | 3.5 | 60.59 | Pale yellow solid |
| 21 | 7 | DMO | 9.5 | 3.5 | 54.37 | Soft white paste |
| 22 | 8 | HE | 9.5 | 3.5 | 53.48 | Soft pale yellow Solid |

TABLE 3-continued

| Example | Acid Dispersant | Branched Alcohol | ε-cap | δ-val | Acid value of TPOAC alcohol | Appearance |
|---|---|---|---|---|---|---|
| 23 | 9 | EB | 9.5 | 3.5 | 54.01 | Soft pale yellow Solid |
| 24 | 10 | BuOc | 9.5 | 3.5 | 49.86 | Soft pale yellow paste |
| 25 | 11 | Bu/Hex | 9.5 | 3.5 | 49.09 | Pale yellow paste |
| 26 | 12 | Hex/Oct (1) | 9.5 | 3.5 | 54.15 | Pale orange viscous liquid |
| 27 | 13 | Hex/Oct (2) | 9.5 | 3.5 | 47.01 | Pale yellow viscous liquid |

Footnote to Table 3
TDOD is Tetradecyloctadecanol (Isofol 32 ex Condea)
EtHe is 2-ethylhexanol (ex Aldrich)
TMH is 3,5,5-trimethylhexanol (ex Aldrich)
DMO is 3,7-dimethyloctanol (ex Aldrich)
HE is 3-heptanol (ex Aldrich)
EB is 2-ethylbutanol (ex Aldrich)
BuOc is 2-butyl-1-octanol (Isofol 12 ex Condea)
Bu/Hex is a mixture of 2-butyl-1-octanol, 2-hexyl-1-octanol, 2-butyl-1-decanol and 2-hexyl-1-decanol (Isofol 14T ex Condea)
Hex/Oct (1) is a mixture of 2-hexyl-1-decanol, 2-octyl-1-decanol, 2-hexyl-1-dodecanol and 2-octyl-1-dodecanol (Isofol 18T ex Condea)
Hex/Oct (2) is similar to Hex/Oct(1) (Isofol 18E ex Condea)

a) Amine Dispersants

EXAMPLES 28 to 37

Solubility in toluene

The dispersant (2 parts) was dissolved in toluene (10 ml) by warming as necessary and then examined after 16 hours at 20° C. The samples were also assessed after storage for 3 days at 4° C., after 3 days at −10° C. and also after 24 hours standing at 20° C. following 3 days storage at −10° C. The results are given in Table 4 below. All dispersants have a ratio of TPOAC to PEI of 13:1 by weight.

TABLE 4

| Example | Amine Dispersant | TPOAC | 24 hours at 20° C. | 3 days at 4° C. | 3 days at −10° C. | −10° C. and then 20° C. |
|---|---|---|---|---|---|---|
| 28 | 1 | BuOc 1, cap 12, val 2 | clear | clear | clear | clear |
| 29 | 2 | HeDe 1, cap 12, val 2 | clear | clear | clear | clear |
| 30 | 3 | OcDo 1, cap 12, val 3 | clear | clear | clear | clear |
| 31 | 4 | DeTe 1, cap 12, val 3 | clear | clear | clear | clear |
| 32 | 5 | EtBu 1, cap 12, val 3 | clear | clear | clear | clear |
| 33 | 6 | EtHe 1, cap 12, val 3 | clear | clear | clear | clear |
| 34 | 7 | BuOc 1, cap 12, val 3 | clear | clear | clear | clear |
| 35 | 8 | HeDe 1, cap 12, val 3 | clear | clear | clear | clear |
| 36 | 9 | BuOc 1, cap 12 | clear | clear | few crystals | clear |
| 37 | 10 | HeDe 1, cap 12 | clear | clear | clear | clear |
| Control 1 | — | — | clear | clear | crystals | clear |

Footnote to Table 4
The TPOAC acids are explained in Examples 7 to 13.
Control 1 is PEI having a POAC chain derived from ε-caprolactone according to EP 158406.

EXAMPLES 38 to 47

Solubility in 4:1 mixture of methoxypropylacetate/n-butanol (MPA/Bu)

Examples 28 to 37 were repeated except replacing toluene with an equal volume of MPA/Bu. The solubility results are given in Table 5 below.

TABLE 5

| Example | Amine Dispersant | TPOAC | 24 hours at 20° C. | 3 days at 4° C. | 3 days at −10° C. | −10° C. and then 20° C. |
|---|---|---|---|---|---|---|
| 38 | 1 | BuOc 1, cap 12, val 2 | clear | clear | crystals | clear |
| 39 | 2 | HeDe 1, cap 12, val 2 | clear | clear | crystals | clear |

TABLE 5-continued

| Example | Amine Dispersant | TPOAC | 24 hours at 20° C. | 3 days at 4° C. | 3 days at −10° C. | −10° C. and then 20° C. |
|---|---|---|---|---|---|---|
| 40 | 3 | OcDo 1, cap 12, val 3 | clear | clear | crystals | clear |
| 41 | 4 | DeTe 1, cap 12, val 3 | clear | clear | clear | clear |
| 42 | 5 | EtBu 1, cap 12, val 3 | clear | clear | crystals | clear |
| 43 | 6 | EtHe 1, cap 12, val 3 | clear | clear | crystals | clear |
| 44 | 7 | BuOc 1, cap 12, val 3 | clear | clear | few crystals | clear |
| 45 | 8 | HeDe 1, cap 12, val 3 | clear | clear | few crystals | clear |
| 46 | 9 | BuOc 1, cap 12 | clear | few crystals | crystals | few crystals |
| 47 | 10 | HeDe 1, cap 12 | clear | few crystals | crystals | few crystals |
| Control 1 | — | — | clear | few crystals | crystals | crystals |

Footnote to Table 5
TOPAC and Control 1 are as explained in the footnote to Table 4.

EXAMPLES 48 to 57

Solubility in Butylacetate

Examples 28 to 37 were repeated except using an equal volume of butylacetate in place of toluene. The results are given in Table 6 below.

TABLE 6

| Example | Amine Dispersant | TPOAC | 24 hours at 20° C. | 3 days at 4° C. | 3 days at −10° C. | −10° C. and then 20° C. |
|---|---|---|---|---|---|---|
| 48 | 1 | BuOc 1, cap 12, val 2 | clear | clear | few crystals | clear |
| 49 | 2 | HeDe 1, cap 12, val 2 | clear | clear | crystals | clear |
| 50 | 3 | OcDo 1, cap 12, val 3 | clear | clear | few crystals | clear |
| 51 | 4 | DeTe 1, cap 12, val 3 | clear | clear | few crystals | clear |
| 52 | 5 | EtBu 1, cap 12, val 3 | clear | clear | crystals | clear |
| 53 | 6 | EtHe 1, cap 12, val 3 | clear | clear | crystals | clear |
| 54 | 7 | BuOc 1, cap 12, val 3 | clear | clear | few crystals | clear |
| 55 | 8 | HeDe 1, cap 12, val 3 | clear | clear | few crystals | clear |
| 56 | 9 | BuOc 1, cap 12 | clear | few crystals | crystals | crystals |
| 57 | 10 | HeDe 1, cap 12 | clear | few crystals | crystals | crystals |
| Control 1 | — | — | clear | few crystals | crystals | crystals |

Footnote to Table 6
TPOAC and Control 1 are as explained in the footnote to Table 4.

EXAMPLES 58 to 67

Pigment millings with Amine Dispersants

The Dispersant (0.45 parts) was dissolved in a 4:1 mixture of methoxypropylacetate and n-butanol (7.55 parts) with warming as necessary. Glass beads (3 mm diameter, 17 parts) and red pigment (2 parts, Monolite Rubine 3B ex Avecia) were added and the contents milled on a horizontal shaker for 17 hours. The fluidity of the resultant dispersions was assessed by hand-shaking using an arbitrary scale A to E (good to bad). The results are given in Table 7 below.

TABLE 7

| Example | Amine Dispersant | TPOAC | Fluidity |
|---|---|---|---|
| 58 | 1 | BuOc 1, cap 12, val 2 | B |
| 59 | 2 | HeDe 1, cap 12, val 2 | A/B |
| 60 | 3 | OcDo 1, cap 12, val 3 | A/B |
| 61 | 4 | DeTe 1, cap 12, val 3 | B |
| 62 | 5 | EtBu 1, cap 12, val 3 | B |
| 63 | 6 | EtHe 1, cap 12, val 3 | C |
| 64 | 7 | BuOc 1, cap 12, val 3 | A/B |
| 65 | 8 | HeDe 1, cap 12, val 3 | B/C |
| 66 | 9 | BuOc 1, cap 12 | C |
| 67 | 10 | HeDe 1, cap 12 | B/C |
| Control 1 | — | — | C |
| Control 2 | — | — | C |

Footnote to Table 7

TPOAC and Control 1 are as explained in the footnote to Table 4.
Control 2 is the lauric acid end-capped analogue of Dispersant 1 made as described in WO 98/19784.

b) Acid Dispersants

EXAMPLES 68 to 74

Solubility in toluene

Examples 28 to 37 were repeated with Acid Dispersants. The results are given in Table 8 below.

TABLE 8

| Example | Acid Dispersant | TPOAC | 24 hours at 20° C. | 3 days at 4° C. | 3 days at −10° C. | −10° C. and then 20° C. |
|---|---|---|---|---|---|---|
| 68 | 5 | EtHe 1, cap 9.5, val 3.5 | clear | clear | clear | clear |
| 69 | 6 | TMH 1, cap 9.5, val 3.5 | clear | clear | clear | clear |
| 70 | 7 | DMO 1, cap 9.5, val 3.5 | clear | clear | clear | clear |
| 71 | 8 | HE 1, cap 9.5, val 3.5 | clear | clear | clear | clear |
| 72 | 9 | EB 1, cap 9.5, val 3.5 | clear | clear | clear | clear |
| 73 | 10 | BuOc 1, cap 9.5, val 3.5 | clear | clear | clear | clear |
| 74 | 11 | Bu/Hex 1, cap 9.5, val 3.5 | clear | clear | clear | clear |
| Control 3 | | | hazy | crystals | crystals | hazy |

Footnote to Table 8

TPOAC is explained in Examples 18 to 37 and the footnote to Table 3.

Control 3 is the phosphate ester of lauryl end-capped polyester obtained from ϵ-caprolactone made as described in EP 164817.

EXAMPLES 75 to 81

Solubility of Acid Dispersants in a 4:1 mixture of methoxypropylacetate/n-butanol Examples 38 to 47 were repeated with the Acid Dispersants listed in Table 9 below:

TABLE 9

| Example | Acid Dispersant | TPOAC | 24 hours at 20° C. | 3 days at 4° C. | 3 days at −10° C. | −10° C. and then 20° C. |
|---|---|---|---|---|---|---|
| 75 | 5 | EtHe 1, cap 9.5, val 3.5 | hazy | hazy | crystals | hazy |
| 76 | 6 | TmH 1, cap 9.5, val 3.5 | hazy | hazy | crystals | hazy |
| 77 | 7 | DMO 1, cap 9.5, val 3.5 | hazy | hazy | crystals | hazy |
| 78 | 8 | HE 1, cap 9.5, val 3.5 | hazy | hazy | crystals | hazy |
| 79 | 9 | EB 1, cap 9.5, val 3.5 | hazy | hazy | crystals | hazy |
| 80 | 10 | BuOc 1, cap 9.5, val 3.5 | hazy | hazy | crystals | hazy |
| 81 | 11 | Bu/Hex 1, cap 9.5, val 3.5 | hazy | hazy | crystals | hazy |
| Control 3 | | | hazy | crystals | crystals | crystals |

Footnote to Table 9
TPOAC is explained in Examples 18 to 27 and the footnote to Table 3.
Control 3 is explained in the footnote to Table 8.

EXAMPLES 82 to 88

Solubility of Acid Dispersant in butylacetate

Examples 48 to 57 were repeated except using the Acid Dispersants listed in Table 10 below:

TABLE 10

| Example | Acid Dispersant | TPOAC | 24 hours at 20° C. | 3 days at 4° C. | 3 days at −10° C. | −10° C. and then 20° C. |
|---|---|---|---|---|---|---|
| 82 | 5 | EtHe 1, cap 9.5, val 3.5 | slightly hazy | slightly hazy | crystals | slightly hazy |
| 83 | 6 | TMH 1, cap 9.5, val 3.5 | hazy | crystals | crystals | hazy |
| 84 | 7 | DMO 1, cap 9.5, val 3.5 | slightly hazy | hazy | crystals | slightly hazy |
| 85 | 8 | HE 1, cap 9.5, val 3.5 | hazy | hazy | crystals | hazy |
| 86 | 9 | EB 1, cap 9.5, val 3.5 | hazy | hazy | crystals | hazy |
| 87 | 10 | BuOc 1, cap 9.5, val 3.5 | hazy | hazy | crystals | hazy |
| 88 | 11 | Bu/Hex 1, cap 9.5, val 3.5 | hazy | hazy | crystals | hazy |
| Control 3 | | | hazy | crystals | crystals | crystals |

Footnote to Table 10
TPOAC is explained in Examples 18 to 27 and the footnote to Table 3.
Control is explained in the foonote to Table 8.

EXAMPLES 89 to 99

Red Pigment millings with Acid Dispersants

The Acid Dispersant (0.25 parts) was dissolved in a 4:1 mixture of methoxypropylacetate (6.75 parts) by heating as necessary. Glass beads (3 mm, 17 part) and red iron oxide pigment (3 parts, Sicotrans Red L2817 ex BASF) were added and the contents milled for 17 hours on a horizontal shaker. The fluidity of the resultant as assessed by hand shaking and using an arbitrary scale A to C (good to bad).

The results are given in Table 11 below:

TABLE 11

| Example | Acid Dispersant | TPOAC | Fluidity |
|---|---|---|---|
| 89 | 3 | OcDo 1, cap 9.5, val 3.5 | B |
| 90 | 4 | TDOD 1, cap 9.5, val 3.5 | B/C |
| 91 | 5 | EtHe 1, cap 9.5, val 3.5 | A/B |
| 92 | 6 | TMH 1, cap 9.5, val 3.5 | B/C |
| 93 | 7 | DMO 1, cap 9.5, val 3.5 | A |
| 94 | 8 | HE 1, cap 9.5, val 3.5 | A |
| 95 | 9 | EB 1, cap 9.5, val 3.5 | B |
| 96 | 10 | BuOc 1, cap 9.5, val 3.5 | B |
| 97 | 11 | Bu/Hex 1, cap 9.5, val 3.5 | B |
| 98 | 12 | Hex/Oct 1, cap 9.5, val 3.5 | C |
| 99 | 13 | Hex/Oct 1, cap 9.5, val 3.5 | B |
| Control 3 | | | C |
| Control 4 | | | C |

Footnote to Table 11
TPOAC is explained in Example 17 to 27 and the footnote to Table 3.
Control 3 is explained in the footnote to Table 8.
Control 4 is a decanol end-capped analogue of Acid Dispersant 3 made as described in WO 98/19784.

EXAMPLES 100 to 110

White pigment millings with Acid Dispersants

Examples 89 to 99 were repeated except using 0.2 parts Acid Dispersant, 2.3 parts solvent mixture and a white pigment (7.5 parts titanium oxide, Tioxide TR 92 ex Tioxide Co.) The fluidity results are given in Table 12 below.

TABLE 12

| Example | Acid Dispersant | TPOAC | Fluidity |
|---|---|---|---|
| 100 | 3 | OcDo 1, cap 9.5, val 3.5 | B |
| 101 | 4 | TDOD 1, cap 9.5, val 3.5 | B/C |
| 102 | 5 | EtHe 1, cap 9.5, val 3.5 | A |
| 103 | 6 | TMH 1, cap 9.5, val 3.5 | B/C |
| 104 | 7 | DMO 1, cap 9.5, val 3.5 | B/C |
| 105 | 8 | HE 1, cap 9.5, val 3.5 | A |
| 106 | 9 | EB 1, cap 9.5, val 3.5 | B/C |
| 107 | 10 | BuOc 1, cap 9.5, val 3.5 | A |
| 108 | 11 | Bu/Hex 1, cap 9.5, val 3.5 | B |
| 109 | 12 | Hex/Oct 1, cap 9.5, val 3.5 | B |
| 110 | 13 | Hex/Oct 1, cap 9.5, val 3.5 | A |
| Control 3 | | | C/D |
| Control 4 | | | C |

Footnote to Table 12
TPOAC is explained in Examples 17 to 27 and the footnote to Table 3.
Control 3 is explained in the footnote to Table 8.
Control 4 is a decanol end-capped analogue of Acid Dispersant 3 made as described in WO 98/19784.

EXAMPLES 111 to 121

Amine Dispersants

The amine dispersants listed in Table 13 below were prepared in similar manner to that described in Example 7 where the TPOAC acid was prepared in similar manner to that described in Example 1. In Table 13, the starting materials used to prepare the TPOAC are indicated and the number following the legend identifying the starting materials indicates the relative molar quantities. The ratio of TPOAC acid to amine is also given in Table 13 and is the weight ratio of TPOAC acid to amine. Table 13 also records the fluidity of a dispersion prepared using dispersant, Monolite Rubine 3B and a mixture of 4:1($^w/_w$) methoxypropylacetate/n-butanol as described in Examples 58 to 67.

TABLE 13

| Example | Amine Dispersant | TPOAC Acid | Amine | Ratio of TPOAC acid to Amine ($^w/_w$) | Fluidity |
|---|---|---|---|---|---|
| 111 | 11 | DeTe 1,cap8,5-Me cap 2 | PEI SP018 | 6:1 | B/C |
| 112 | 12 | DeTe 1,cap8,5-Me cap 2 | PVA | 17:1 | C |
| 113 | 13 | HeDe 1, HSA 3, cap 3 | PEI SP075 | 10:1 | B/C |
| 114 | 14 | BuOc 1, RA2.5 cap 2.5 | PEI SP 200 | 14:1 | B |
| 115 | 15 | BuOc 1, cap 10, val 2.5 | PEI SP 050 | 11:1 | A/B |
| 116 | 16 | HeDe 1, cap 9, 7-Me cap 3 | PEI SP 030 | 7:1 | B |
| 117 | 17 | OcDo 1, cap 11 | PEI SP 200 | 9:1 | A/B |
| 118 | 18 | HeDe 1, cap 10, Gly 3 | PEI SP 075 | 15:1 | B |
| 119 | 19 | HeDe 1, Val 12 | PEI SP 050 | 10:1 | B |
| 120 | 20 | BuOc 1, cap 10, val 2.5 | PAA | 12:1 | C |

TABLE 13-continued

| Example | Amine Dispersant | TPOAC Acid | Amine | Ratio of TPOAC acid to Amine (w/w) | Fluidity |
|---|---|---|---|---|---|
| 121 | 21 | 3(BuOc 1, RA 2.5 cap 3.5) 9(HeDe 1,cap 9, 7-Me cap3) | PEI SP 200 | 12:1 | B |
| Control 1 | | LA 1, cap 10, val 3 | PEI SP 200 | 18:1 | C/D |
| Control 2 | | SA 1, cap 3.2 HSA 1.8 | PEI SP 200 | 13:1 | CD |
| Control 3 | | cap | PEI | | C |
| Control 4 | | LA, cap, val | PEI | | C |

Footnote to Table 13
DeTe is 2-decyltetradecanoic acid, Isocarb 24 ex Condea GmbH.
HeDe is 2-hexyldecanoic acid, Isocarb 16 ex Condea GmbH
BuOc is 2-octyldodecanoic acid, Isocarb 20 ex Condea GmbH.
Cap is ε-caprolactone ex Aldrich
Val is δ-valerolactone ex Fluka
HSA is 12-hydroxystearic acid ex Aldrich
RA is ricinolecic acid ex Aldrich
5-Me cap is 5-methyl-ε-caprolactone ex WO 98/19784
7-Me cap is 7-methyl-ε-caprolactone ex WO 98/19784
PEI is polyethyleneimine
PVA is polyvinylamine (W 100,000) ex Mitsubishi Kasei
PAA is polyalkylamine (MW 65000) ex Aldrich
SP 018 is PEI MW 1800 ex Nippon Shokubai
SP 075 is PEI MW 7500 ex Nippon Shokubai
SP 200 is PEI MW 10,000 ex Nippon Shokubai
SP 050 is PEI MW 50000 ex Nippon Shokubai
SP 030 is PEI MW 3000 ex Nippon Shokubai
Control 1 is lauric acid 1, cap 10, glycolic acid 3 with PEI SP 200 (18:1), Dispersant 22 of WO 99/49963.
Control 2 is stearic acid 1, cap 3.2, 12-hydroxystearic acid 1.8 with PEI SP 200, Example 4 of WO 94/21368
Control 3 is PEI having a POAC chain derived from ε-caprolactone according to EP 158406
Control 4 is a lauric acid end-capped analogue of Dispersant 1 made as described in WO 98/19784

EXAMPLE 122

(BuOc, cap 8, val 3, HEA 1) PEI 7:1

2-Butyloctanoic acid (13 parts, 0.065M, Isocarb 12 ex Condea GmbH) and thionyl chloride (8.49 parts, 0.071M ex Aldrich) were stirred in toluene (26 ml) at 125° C. for 8 hours to form the aid chloride. The toluene and excess thionyl chloride were removed by evaporation under reduced pressure to give a brown liquid (12.6 parts).

ε-caprolactone (35 parts, 0.31 M ex Aldrich), δ-valerolactone (11.51 parts, 0.115 M ex Fluka), 2-hydroxyethylacrylate (0.038M ex Aldrich), methylhydroquinone (0.1 parts ex Aldrich) and orthophosphoric acid (0.1 parts) were stirred together at 120° C. under a stream of air for 8 hours. The above acid chloride (8.38 parts, 0.038 m) was then added and the reactants were stirred at 120° C. for a further 4 hours under a stream of air. On cooling, the polyester acrylate was obtained as a brown liquid (56 parts).

This polyester acrylate (35 parts) and PEI SP 018 (5 parts, MW 1800 ex Nippon Shokubai) were stirred at 65° C. for 2 hours to give an orange viscous liquid (39 parts). This is Amine Dispersant 22.

Amine Dispersant 22 gave a dispersion of Monolite Rubine 3B exhibiting a fluidity of B when evaluated as described in Examples 58 to 67. In comparison, Dispersant 3 of WO 99/55763 (val 3, cap 12, HEA 1 with PEI G100 (Lupasol G100, BASF) 18:1) gave a fluidity of C/D.

EXAMPLES 123 to 134

Acid Dispersants

The acid dispersants listed in Table 14 below were prepared in similar manner to that described in Examples 13 and 15 except using the branched alcohols and lactones indicated in the table. The number following the legend identifying the alcohol and lactone(s) indicate their molar ratios. The ratio of the TPOAC alcohol to each phosphorus atom of the phosphating agent is also as indicated. The fluidity of dispersions containing Sicotrans Red L2817 and Tioxide TR 92 was also determined as described in Examples 89 to 110.

TABLE 14

| Example | Acid Dispersant | TPOAC alcohol | Ratio of TPOAC alcohol to P | Amine Salt | Red L2817 | White TR 92 |
|---|---|---|---|---|---|---|
| 123 | 14 | DeTe 1, cap 7,5-ᵗBu cap | 1.5:1 | — | A | A |
| 124 | 15 | OcDo 1, cap 8, 7-Me cap | 3:1 | DEA | B/C | A/B |
| 125 | 16 | HeDe 1, cap 11 | 3:1 | — | A | A |
| 126 | 17 | DoHe 1, cap 7, 4-Me cap 1.5 | 2:1 | DMEA | A | A |
| 127 | 18* | HeOc 1, cap 6, 7-Me cap 1 | 2.5:1 | — | B/C | B/C |
| 128 | 19 | CeAr 1, cap 6, 4-Me cap 3 | 2:1 | — | A | A |

TABLE 14-continued

| Example | Acid Dispersant | TPOAC alcohol | Ratio of TPOAC alcohol to P | Amine Salt | Red L2817 | White TR 92 |
|---|---|---|---|---|---|---|
| 129 | 20 | EtHe 1, cap 10, val 2.5 | 1.5:1 | — | A | A |
| 130 | 21 | Cy 1, cap 10 | 1.75:1 | DEA | A | A |
| 131 | 22 | Nor 1, val 12 | 2:1 | — | A | A |
| 132 | 23 | CDP 1, cap 8, val 8 | 2.5:1 | — | A | A/B |
| 133 | 24 | BuOc-5EO 1, cap 6, val | 2.25:1 | DEA | A/B | A |
| 134 | 25 | HeDe-10E, cap 9 | 2:1 | — | A | A |
| Control 3 | | | | | C | C/D |
| Control 4 | | | | | C | C |

Footnote to Table 14
DeTe is 2-decyl-1-tetradecanol as Isofol 24 ex Condea GmbH
OcDo is 2-octyl-1-dodecanol as Isofol 20 ex Condea GmbH
HeDe is 2-hexyl-1-decanol as Isofol 16 ex Condea GmbH
DoHe is 2-dodecyl-1-hexadecanol as Isofol 28 ex Condea GmbH
HeOc is 2-hexadecyl-1-octadecanol as Isofol 34T ex Condea GmbH
CeAr is 2-cetyl-1-arachidol as Isofol 36 ex Condea GmbH
EtHe is 2-ethylhexanol ex Aldrich
Cy is cyclohexanol ex Aldrich
Nor is exo-Norborneol ex Aldrich
CDP is 3-chloro-2, 2-dimethyl-1-propanol ex Aldrich
BuOc-5EO is 2-butyl-1-octanol-5EO ex Condea GmbH
HeDe-10EO is 2-hexyl-1-decanol-10EO ex Condea GmbH
cap is ε-caprolactone ex Aldrich
val is δ-valerolactone ex Fluka
5-$^t$Bu cap is 5-tert butyl-68 -caprolactone ex WO 98/19784
7-Me cap is 7-methyl-ε-caprolactone ex WO 98/19784
4-Me cap is 4-methyl-ε-caprolactone ex WO 98/19784
DEA is diethanolamine
DMEA is dimethylethanolamine
*Dispersant 18 is a sulphate ester using the amount of sulphuric acid shown in place of the phosphating agent ($P_2O_5$)
Control 3 is the phosphate ester of lauryl end-capped polyester obtained from ε-caprolactone made as described in EP 164817
Control 4 is a decanol end-capped analogue of Acid Dispersant 3 made as described in WO 98/19784

EXAMPLES 135 to 146

Acid Dispersants

Further acid dispersants were prepared from the starting materials listed in Table 15 below using the method described in Examples 13 and 15.

TABLE 15

| Example | Acid Dispersant | TPOAC alcohol | Ratio of TPOAC alcohol to P | Salt |
|---|---|---|---|---|
| 135 | 26 | HeDe 1, cap 3.5, val 1 | 1:1 | — |
| 136 | 27 | OcDo 1, cap 3.2, val 0.8 | 1:1 | — |
| 137 | 28 | HeOc 1, cap 1.95, val 0.65 | 1:1 | — |
| 138 | 29 | HeDe 1, cap 3.2, val 1.05 | 1:1 | — |
| 139 | 30 | BuOc 1, cap 7 | 1:1 | — |
| 140 | 31 | BuOc 1, cap 4, val 1 | 1:1 | — |
| 141 | 32 | HeDe 1, cap 1.75, val 0.25 | 1.5:1 | — |
| 142 | 33 | HeDe 1, cap 4 | 1.25:1 | — |
| 143 | 34 | HeDe 1, cap 2 | 1.25:1 | — |
| 144 | 35 | BuOc*1, cap 6, 7-Mecap 1.5 | 1:1 | — |
| 145 | 36 | OcDo 1, cap 3, 7-Mecap 1 | 1:1 | — |
| 146 | 37 | BuOc-5EO 1, cap 3 | 1.375:1 | — |
| Control 1 | | Do 1, cap 8 | 1:1 | — |
| Control 2 | | Do 1, cap 6, val 2 | 1:1 | — |
| Control 3 | | Do 1, val 3 | 1:1 | — |
| Control 4 | | Do 1, cap 3 | 2:1 | — |

Footnote to Table 15
HeDe is a mixture containing 2-hexyl-1-decanol as Isofol 18T ex Condea GmbH
OcDo is 2-octyl-1-dodecanol as Isofol 20 ex Condea GmbH
HeOc is 2-hexyldecyl-1-octadecanol as Isofol 34T ex Condea GmbH
HeDe* is a mixture containing 2-hexyl-1-decanol as Isofol 18E ex Condea GmbH
BuOc is 2-butyl-1-octanol as Isofol 12 ex Condea Gmbh
BuOc* is a mixture containing 2-butyl-1-octanol as Isofol 14T ex Condea GmbH
BuOc-5EO is 2-butyl-1-octanol-5EO ex Condea GmbH
cap is ε-caprolactone ex Aldrich
val is δ-valerolactone ex Fluka
7-Me cap is 7-methyl-ε-caprolactone ex WO 98/19784
Do is 1-dodecanol ex Aldrich

EXAMPLE 147

The Acid Dispersant (5 parts) and non-polar solvent (5 parts, Solvesso 100) were placed in an 8-dram vial and warmed to dissolve the dispersant as necessary. The samples were then stored at 4° C. for 24 hours, stored at −15° C. for 48 hours and also stored at −15° C. for 48 hours then 25° C. The results are given in Table 16 below.

TABLE 16

| Acid Dispersant | 25° C. | 48 hours at 4° C. | 48 hours at −15° C. | 48 hours at −15° C. then 25° C. |
|---|---|---|---|---|
| 26 | C | C | H | C |
| 27 | C | C | C | C |
| 28 | H | G | SO | C |
| 29 | C | C | H | C |
| 30 | C | SE | SO | H |
| 31 | C | C | SE | C |
| 32 | C | C | C | C |
| 33 | C | H | H | H |
| 34 | C | C | C | C |
| 35 | C | C | H | C |
| 36 | C | C | C | C |
| 37 | C | C | H | C |
| Control 1 | C | SO | SO | SO |
| Control 2 | C | SE | SO | SE |
| Control 3 | C | G | SO | H |
| Control 4 | C | SO | SO | G |

Footnote to Table 16
C is clear, H is hazy, G is gels, SO is solid, SE is seeds or crystals.
Controls 1 to 4 are as explained in Table 15.

EXAMPLE 148

Acid Dispersants 26 to 37 (1.75 parts) dissolved in non-polar liquid (1.75 parts Solvesso 100) were added to an unsaturated polyester resin (50 parts Crystic Resin PALV ex Scott-sader) in a dispermat mill pot with external cooling to 20° C. Alumina trihydrate (87.5 parts, FRF40 ex Alcan) was added to the resin whilst maintaining a "rolling doughnut" at higher mixing speed. At 15 min mixing, the viscosity of the polyester resin formulation was measured against shear rate on a TA Instruments controlled stress Rheometer, using a 4 cm flat plate geometry with a gap of 250 pm. Those resin formulations containing Acid Dispersants 26 to 37 exhibited lower viscosity and superior resistance to settling compared with known dispersants represented by controls 1 to 4 of Table 15.

The invention claimed is:

1. A dispersant of formula 1

T-X-(A)$_n$-Y-Z  (1)

wherein

T is branched alkyl;
X is —CO—, —O—, —S—, —NR$^3$— or polyether;
R$^3$ is hydrogen, C$_{1-20}$-alkyl or T-CO—;
A is oxyalkylene carbonyl and/or oxyalkenylene carbonyl (POAC);
Y is a divalent linkage selected from the residue of a diol, polyol, dicarboxylic acid, diisocyanate, and a direct bond;
Z is a sulfonate, sulphate, phosphonate, or phosphate;
n is from 2 to 100,
including salts thereof, except where the dispersant is a phosphate ester of either isostearyl alcohol reacted with 10 moles of ε-caprolactone or isostearyl alcohol with 8 moles of ethyleneoxide and 15 moles of ε-caprolactone and further characterized in that the branched alkyl group, T, enhances the solubility of said dispersant in an organic media.

2. The dispersant as claimed in claim 1 wherein T contains 6 to 36 carbon atoms.

3. The dispersant as claimed in claim 2 wherein T is the residue of an aliphatic alcohol, T-OH, and wherein T-OH is, 2-ethylbutanol, 3-heptanol, 2-ethylhexanol, 3,5,5-trimethylhexanol, 3,7-dimethyloctanol or a Guerbet alcohol, including mixtures thereof.

4. The dispersant as claimed in claim 2 wherein T is the residue of an aliphatic acid, T-COOH, and wherein T-COOH is 2-ethylbutyric, ethyihexanoic, 2-butyloctanoic, 2-hexyldecanoic, 2-octyldodecanoic or 2-decyltetradecanoic acid, including mixtures thereof.

5. The dispersant as claimed in claim 1 wherein A is derived from glycolic acid, lactic acid, hydroxyvaleric acid, hydroxycaproic acid, ricinoleic acid, 12-hydroxystearic acid, 12-hydroxydodecanoic acid, 5-hydroxydodecanoic acid, 5-hydroxydecanoic acid, 4-hydroxydecanoic acid, or mixtures thereof.

6. The dispersant as claimed in claim 1 wherein A is derived from propiolactone, alkyl substituted-caprolactone, alkyl substituted δ-valerolactone, or mixtures thereof.

7. The dispersant as claimed in claim 6 wherein the molar ratio of ε-caprolactone to δ-valerolactone is from 20:1 to 1:5.

8. The dispersant as claimed in either claim 1 or claim 2 wherein Z is a phosphate.

9. The dispersant as claimed in either claims 1 or claim 2 which is of formula 9

[T-J-(CO—V—O)$_n$]$_w$-L$^1$M  (9)

wherein

J is oxygen or a polyether;
(CO—V—O) represents A;
L$^1$ is phosphate;
M is a cation; and
w is 1 or 2;
including mixtures thereof.

10. A process for making a dispersant as claimed in claim 9 which comprises reacting a TPOAC alcohol of formula 2

T-X—(CO—V—O)$_n$H  (2)

with a phosphating agent in an inert atmosphere at a temperature between 60 and 120° C.,
wherein CO—V—O represents A.

11. A dispersion comprising a particulate solid, an organic medium and a dispersant of formula 1

T-X-(A)$_n$-Y-Z  (1)

wherein

T is branched alkyl;
X is —CO—, —O—, —S—, —NR$^3$— or polyether;
R$^3$ is hydrogen, C$_{1-20}$-alkyl or T-CO—;
A is oxyalkylene carbonyl and/or oxyalkenylene carbonyl (POAC);
Y is a divalent linkage that is selected from the residue of a diol, residue of a polyol, residue of a dicarboxylic acid, residue of a diisocyanate, direct bond, or when Z is a basic group or a moiety containing basic group then a residue of an ethylenically unsaturated group connecting Z with -(A)$_n$;
Z is a sulfonate, sulphate, phosphonate, phosphate, polyamine or polyimine where T-X-(A)$_n$-Y— is attached to the polyamine or polyimine via amide and/or salt links or via a Michael addition reaction;
n is from 2 to 100, and
when Z is a polyamine or polyimine; the dispersant is optionally of formula

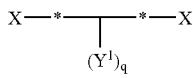

wherein
X-*-*-X represents polyamine or polyimine;
$Y^1$ represents T-X-(A)$_n$-Y;
q is from 2 to 2000
including salts thereof
and further characterized in that the branched alkyl group, T, enhances the solubility of said dispersant in said organic medium.

12. A milbase comprising a particulate solid, an organic medium, a film-forming resin and a dispersant of formula 1

T-X-(A)$_n$-Y-Z  1 wherein
T is branched alkyl;
X is —CO—, —O—, —S—, —NR$^3$— or polyether;
R$^3$ is hydrogen, C$_{1-20}$-alkyl or T-CO—;
A is oxyalkylene carbonyl and/or oxyalkenylene carbonyl (POAC);
Y is a divalent linkage selected from a residue of a diol, a residue of a polyol, a residue of a dicarboxylic acid, a residue of a diisocyanate, a direct bond, or when Z is a basic group or a moiety containing basic group then a residue of an ethylenically unsaturated group;
Z is a sulfonate, sulphate, phosphonate, phosphate, polyamine or polyimine where T-X-(A)$_n$-Y— is attached to the polyamine or polyimine via amide and/or salt links or via a Michael addition reaction;
n is from 2 to 100, and
when Z is a polyamine or polyimine; the dispersant is optionally of formula

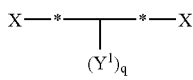

wherein
X-*-*-X represents polyamine or polyimine;
$Y^1$ represents T-X-(A)$_n$-Y—;
q is from 2 to 2000
including salts thereof
and further characterized in that the branched alkyl group, T, enhances the solubility of said dispersant in said organic medium.

13. A paint or ink comprising a particulate solid, an organic medium, a film-forming resin and a dispersant of formula 1

T-X-(A)$_n$-Y-Z  1 wherein
T is branched alkyl;
X is —CO—, —O—, —S—, —NR$^3$— or polyether;
R$^3$ is hydrogen, C$_{1-20}$-alkyl or T-CO—;
A is oxyalkylene carbonyl and/or oxyalkenylene carbonyl (POAC);
Y is a divalent linkage selected from a residue of a diol, a residue of a polyol, a residue of a dicarboxylic acid, a residue of a diisocyanate, a direct bond, or when Z is a basic group or a moiety containing basic group then a residue of an ethylenically unsaturated group;
Z is a sulfonate, sulphate, phosphonate, phosphate, polyamine or polyimine where T-X-(A)$_n$-Y— is attached to the polyamine or polyimine via amide and/or salt links or via a Michael addition reaction;
n is from 2 to 100, and
when Z is a polyamine or polyimine; the dispersant is of optionally formula

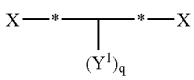

wherein
X-*-*-X represents polyamine or polyimine;
$Y^1$ represents T-X-(A)$_n$-Y—;
q is from 2 to 2000
including salts thereof
and further characterized in that the branched alkyl group, T, enhances the solubility of said dispersant in said organic medium.

14. The dispersion as claimed in claim 11 wherein Z is the residue of polyallylamine, polyvinylamine, or poly (C$_{2-4}$-alkyleneimine).

15. The dispersion as claimed in claim 11 wherein the dispersant comprises polyvinylamine, polyallylamine or poly (C$_{2-4}$-alkyleneimine) (PAI) carrying at least two polyoxyalkylenecarbonyl chains (POAC) of formula 4

T-CO—(O—V—CO)$_n$—  4 wherein —(O—V—CO)— represents A.

16. A dispersion as claimed in claim 11 wherein the weight ratio of (Y$^1$)$_q$ to X-*-*-X is from 30:1 to 1:1.

17. The dispersion as claimed in claim 11, wherein the dispersant comprises a chain residue of formula 13

—CH$_2$—CH(R)—COOR$^1$—O—(CO—V—O)$_n$—OC-T  13 wherein
R is H or C$_{1-4}$-alkyl;
R$^1$ is an aliphatic or aromatic residue containing up to 10 carbon atoms which optionally contains a polyether residue derivable from propyleneoxide and/or ethyleneoxide; and —(CO—V—O) represents A.

18. A process for making a dispersion as claimed in claim 11 which comprises mixing in any order a particulate solid, an organic medium, and a dispersant of formula 1, wherein said dispersant of formula 1 is made by reacting a TPOAC acid of formula 3

T-X—(O—V—CO)$_n$OH  3 with polyvinylamine, polyallylamine or poly (C$_{2-4}$-alkyleneimine) in an inert atmosphere at between 80 and 150° C. wherein —(O—V—CO)— represents A.

19. A process for making a dispersion as claimed in claim 11 which comprises mixing in any order a particulate solid, an organic medium, and a dispersant of formula 1, wherein said dispersant of formula 1 is made by reacting polyvinylamine, polyallylamine or poly (C$_{2-4}$-alkyleneimine) with a compound of formula 14

—CH=C(R)—COOR$^1$—O—(CO—V—O)$_n$—OC-T  14 in an inert solvent and at a temperature between 10 and 130° C.

wherein
R is H or $C_{1-4}$-alkyl ; and
$R^1$ is an aliphatic or aromatic residue containing up to 10 carbon atoms which optionally contains a polyether residue derivable from propylene oxide and/or ethylene oxide.

20. The dispersion as claimed in claim 11 wherein n is not greater than 20.

21. The dispersion as claimed in claim 11 wherein T is the residue of an aliphatic alcohol T-OH, wherein T contains from 6 to 36 carbon atoms.

22. The dispersion as claimed in claim 11 wherein T is the residue of an aliphatic acid T-COOH, wherein T contains from 6 to 36 carbon atoms.

* * * * *

UNITED STATES PATENT AND TRADEMARK OFFICE
CERTIFICATE OF CORRECTION

| | | |
|---|---|---|
| PATENT NO. | : 7,348,367 B2 | |
| APPLICATION NO. | : 10/257132 | |
| DATED | : March 25, 2008 | |
| INVENTOR(S) | : Dean Thetford, Patrick J. Sunderland and Tom Annable | |

It is certified that error appears in the above-identified patent and that said Letters Patent is hereby corrected as shown below:

In column 36, claim 4, line 10, please delete the word "ethyihexanoic" and insert --ethylhexanoic--.

Signed and Sealed this

Eighth Day of July, 2008

JON W. DUDAS
*Director of the United States Patent and Trademark Office*